Feb. 19, 1952          J. A. NODSON          2,585,960
METHOD AND APPARATUS FOR TESTING SPRINGS
Filed Jan. 5, 1946
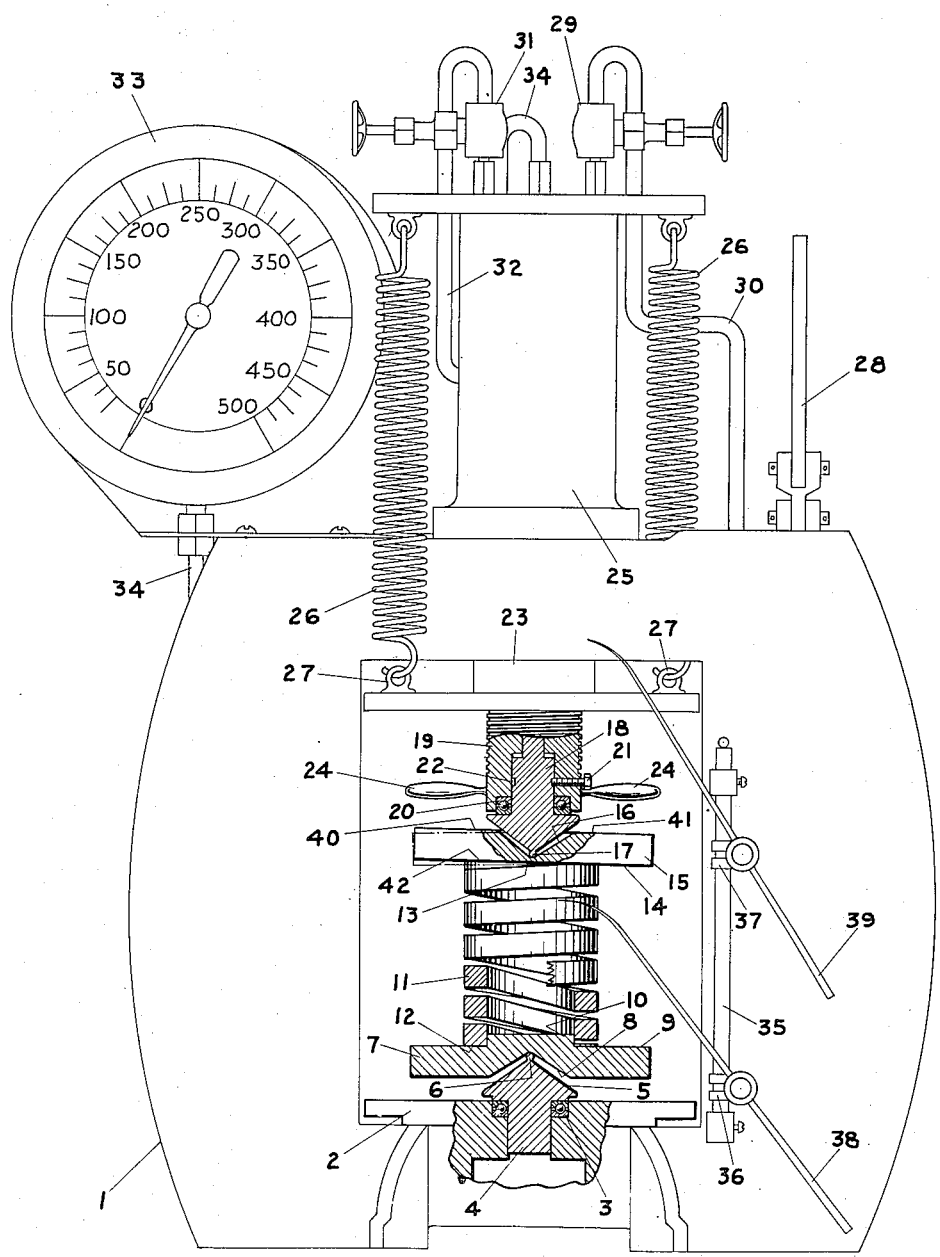
INVENTOR
JOHN A. NODSON
BY M. A. Hayes
ATTORNEY Patented Feb. 19, 1952

2,585,960

UNITED STATES PATENT OFFICE 2,585,960

METHOD AND APPARATUS FOR TESTING SPRINGS

John A. Nodson, Vallejo, Calif.

Application January 5, 1946, Serial No. 639,391

7 Claims. (Cl. 73—161)

(Granted under the act of March 3, 1883, as amended April 30, 1928; 370 O. G. 757)

This invention relates to a method and apparatus for testing springs, particularly safety valve springs.

An object of the invention is to provide a method for testing certain characteristics of a safety valve spring which are directly related to the proper operation of the valve in which it is used and to test the spring under conditions which exhibit those characteristics in the same light as when the spring is actually operating in the valve. Other objects of the invention are to provide a method for testing a helical compression spring while under different loads to determine whether the planes of the ends of spring remain parallel to each other and perpendicular to the axis of the spring when the ends are permitted relative motion; to provide a method for determining the location and amount of material which must be removed from an improperly constructed helical compression spring in order for the planes of its ends to remain parallel to each other while the spring is under certain loads; and to provide a simple, reliable apparatus for performing the aforementioned tests.

In accomplishing these and other objects of the present invention, I have provided improved details of structure, the preferred form of which is illustrated in the accompanying drawing, which is a view, partially in elevation and partially in section of an apparatus embodying the features of the present invention.

Referring more particularly to the drawing:

Numeral 1 indicates the main body of a hydraulic compression device constituting an embodiment of the apparatus of the present invention useful in carrying out the method of the invention. This body may be either a heavy casting or a structure built up from plates welded together, in any case, of sufficient strength to stand the stresses involved in testing specimens. Numeral 2 indicates a base member in which is mounted by means of a thrust bearing 3 a live center 4 for rotation about a vertical axis. The live center 4 has a generally conical upper portion 5 extending from which is a knob or projection 6 of generally spherical shape. Supported on the knob 6 is a bearing plate 7 having a generally conical depression 8, centrally located in its lower surface constituting with the knob 6 a swivel type of self-aligning joint permitting universal angular movement of the plate 7 relative to the live center 4. When the plate 7 rests, unloaded, on the live center 4 its upper plane surface is substantially perpendicular to the axis of rotation of the live center 4. The plate 7 has formed integral therewith and centered on its upper surface a cylindrical boss 10 of a size convenient for guiding and centering a test specimen in the form of a coil spring 11 whose lower surface 12, being the bottom surface of its last turn, rests against the upper surface 9 of the plate 7. The upper surface 13 of the spring 11 bears against the lower surface 14 of a bearing plate 15 identical in construction with plate 7. The plate 15 has a generally conical depression, identical to depression 8, which bears against knob 17, identical to knob 6. The knob 17 is formed on a live center 18, similar to live center 4. The live center 18 is mounted in the compression head 19 and can rotate relative thereto while under compression by virtue of a thrust bearing 20. The axis of the live center 18, the line of motion of the center of the piston 23 and the axis of the live center 4 are all collinear and define the axis of compression. Live center 18 is prevented from falling by a holding screw 21 extending into an annular groove 22 in the live center 18. The compression head 19 is threaded for engagement with the internally threaded hollow piston 23. The handles 24 are provided on the compression head 19 for screwing it into or out of the piston 23. The piston 23 fits into the cylinder 25, rigid with body 1, into which it is retracted when not in use by springs 26 through the medium of ears 27 on a plate attached to the piston 23. The piston 23 is actuated in the cylinder 25 by means of a hydraulic fluid in the conventional manner. The pressure is supplied by a hand operated pump, not shown, powered by handle 28. The flow of fluid to the cylinder 25 is controlled by an inlet valve 29 in the inlet line 30 and an outlet valve 31 in the outlet line 32. The pressure in the cylinder is indicated on the gage 33 connected to the cylinder by tubing 34. Attached to the main frame or body 1, is a vertical guide rod 35 on which are slidable two bracket supports 36 and 37. The supports 36 and 37 can be held at any position on the rod 35 by a thumb screw or similar device not shown. On the support 36 and 37 are pivotally mounted, respectively, the gage markers 38 and 39. The markers 38 and 39 are longitudinally slidable in their pivot pins and engage the pins with sufficient friction to hold them in whatever position they are placed. The pivot pins also have sufficient friction in their mounting to hold them in whatever position they are set so that the markers 38 and 39 may be set at any desired angle to the vertical.

The apparatus shown in the drawing is but one convenient type of testing apparatus for testing springs. The invention is concerned particularly with testing and correcting springs used in safety valves in marine steam power plants. These springs in their free length condition are usually in the general form of a helix generated on a right circular cylinder and of constant pitch except that the last or end turn on each end is brought close to the preceding turn and the end surface ground or machined flat so that the end surfaces of the spring are planes perpendicular to the axis of the spring. The material of which the spring is made is usually steel and may be either circular, rectangular or of other shape, in cross-section. In the drawing a spring 11 of square cross-section is illustrated. The spring is used to hold a safety valve disc against its seat. The spring is never extended to its free length while in use but is compressed by means of an adjustable threaded member bearing on a compression plate at one end of the spring until the force required to compress it further is just equal to that exerted by the steam on the valve disc when the boiler pressure has reached the "popping pressure." This force constitutes the working load under which the spring is normally statically loaded and is thus seen to correspond to the boiler pressure which will "pop" the valve in which the spring is supposed to be used. The popping pressure of each valve is indicated on it by the manufacturer. The force acting on the spring while under working load can be computed by multiplying the popping pressure by the effective area of the valve disc. When the boiler pressure reaches the popping pressure, the valve is said to "pop," that is, the valve disc is lifted off its seat by the steam pressure against the force of the spring and permits the excess steam to escape until the boiler pressure reaches a safe value, at which time the valve disc re-seats itself under the action of the spring. The extent of motion of the valve during this popping action is known as the full lift and its final position as the full lift position. During the lift of the valve disc the length of the spring is shortened by an amount equal to the lift. Each valve is rated as to its lift by the manufacturer.

It has been observed that some safety valves leak continuously at working pressure for failure to seat properly and some valves fail to open properly. Previously, attempts to correct these faults would usually involve (1) re-machining the valve disc and seat and lapping these two parts together and, if this failed, as it often did, to correct the faults, (2) a search for a similar valve in good condition and an interchange of the springs. If the interchange of springs made the good valve faulty and the faulty one good it was assumed that the fault lay in the spring but in which feature was generally not known. Conventional tests such as free length measurements, hardness tests, load-compression tests, etc. did not reveal any deviation of the spring from specification. However, in the development of the present invention it was realized that for proper operation of the valve the spring would have to be of such construction that it would not have a tendency to cock the valve disc and jam it against its guides either under working load at popping pressure or at full lift. It was further realized that although no measurement of the tendency could satisfactorily be made with the spring in the valve under actual operating conditions, nevertheless the required condition of construction would be met if the following criteria were satisfied: that the spring be mounted for test so that planes of its end surfaces would be free to assume any angle relative to the axis of the spring, that the spring be compressed to its working load and that at this load the planes of the end surfaces take a position perpendicular to the axis of the spring, that the spring be further compressed to its full lift position and that at this position the planes of the end surfaces remain perpendicular to the axis of the spring. If, in applying these criteria, it is found that under working load the plane of an end of the spring deviates from perpendicularity to the axis, the condition is corrected by removing sufficient of the material of the last or end turn from the appropriate location, (i. e. the area most remote from the other end of the spring) to render the plane of the end perpendicular to the axis of the spring. The material is removed either by machining, in a lathe or boring mill, or by grinding. After the spring has been machined until the planes of its ends remain perpendicular to its axis while it is under working load, it is further compressed to full lift position. If the planes of the ends of the spring remain substantially perpendicular to the spring's axis the spring will be satisfactory. However, if there is now considerable distortion and the ends are not so disposed, the spring must be discarded as unsatisfactory, since it will not perform properly under actual operating conditions.

The method of the invention is thus seen to involve compressing the spring to its working load under conditions which permit the planes of its ends to assume any angular position relative to the axis of the spring; determining and preferably marking on the spring the location and making some measurement, such as depth of cut, indicative of the amount of material which must be removed from the end turns of the spring to render the planes of the end surfaces perpendicular to the axis of the spring; removing the indicated material, in several trials if necessary, interspersed with tests to determine the angular disposition of the ends; subjecting the re-cut spring to full lift compression and observing whether the planes of the ends remain substantially perpendicular to the axis of the spring. A convenient apparatus for carrying out this method is illustrated in the drawing and has been described in the preceding portion of the specification. Its operation is described herewith.

*Operation*

The specimen spring 11 to be tested is placed on the bearing plate 7, being centered by the boss 10. The bearing plate 15 is placed on top of spring 11, being centered thereover by its boss, not shown, corresponding to boss 10. By means of handles 24 the compression head 19 is unscrewed in its hollow piston 23 until the knob 17 touches the surface of the conical depression 16. The fluid pressure is then applied by pump handle 28 and regulated by valves 29 and 31 until the gage 33 registers such a pressure that the force exerted on the spring 11 by the piston 23 is the same as that which is exerted on the spring when it is in the valve under working load. The required gage pressure can be determined by dividing the product of the rated popping pressure multiplied by the effective area of the disc of the valve in which the spring is used by the area of the piston 23, or, which is the equivalent, by multiplying the rated popping pressure by the ratio of the square of the effective diameter of the valve disc to the square of the diameter of the piston 23. Conveniently, a chart may be posted on the apparatus giving the value of this ratio for various standard sizes of valve discs. In the drawing the bearing plate 15 is shown in its solid line position tilted from the horizontal indicating that the plane of the end surface 13 of the spring is not perpendicular to the axis of the spring. It is possible for the plate 7 to be tilted for similar reasons but for purposes of illustration only one abnormality is shown. The pointed end of the gage marker 39 is now placed so that it touches the righ point 40 on the upper surface of the plate 15 distant from the axis of compression about as far as the coils of the spring. The spring 11 is then rotated, the plates 7 and 15 and the live centers 4 and 18 turning with it through the provision of the thrust bearings 3 and 20, until the low point 41, corresponding to the high point 40, comes beneath the point of gage marker 39 indicates approximately the depth of cut in the material which must be removed from spring 11 to make the plane of its upper surface 13 perpendicular to the axis of the spring. The material must be removed from the high area 42. The area 42 is marked on the spring 11, and the depth of cut is recorded. The spring 11 is then removed from the device and cut or ground to the proper dimensions until, upon recompression to working load, the planes of its ends are perpendicular to the axis of the spring, as illustrated by the dotted line position of plate 15. The spring is then further compressed until its length is shortened by an amount equal to the full lift of the valve. The angular inclination of the planes of the ends is then again tested by rotation in the proximity of the points of the gage markers 38 and 39, and if the planes remain substantially perpendicular to the spring's axis the spring is acceptable; if not, the spring is discarded.

It is obvious that variations in the apparatus described may be made within the scope of the invention without affecting its ability to perform its function. For example, the centers 4 and 18 need not be rotatable in which case the difference in elevation between the high area 42 and the low area would be measured by a scale instead of by reference to gage marker 39.

While I have shown but one embodiment of my invention, it is apparent that the device is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. A method of testing and correcting a compression spring substantially of the form of a cylindrical helix having its ends forming substantially plane surfaces, comprising the steps of mounting the spring for compression with both its ends simultaneously free for universal tilting movement from their normal parallel position, compressing the spring to its working load, determining the location on the spring of the excess material in the end turns of the spring causing deviation of the planes of the ends from perpendicularity to the axis of the spring by remarking the areas of the end turns of the spring which assume positions upon compression of the spring more remote from the central coils of the spring, determining the amount of the excess material by measuring the displacement in a direction toward the central coils of the spring of the corresponding remaining areas of the end turns relative to said first mentioned areas, removing the determined amount from the determined location until the planes of the ends remain perpendicular to the axis of the spring when under working load, compressing the spring to its full lift distance and observing any deviation of the planes of the ends from perpendicularity to the axis of the spring.

2. A method of testing a compression coil spring having substantially the form of a cylindrical helix with its ends being substantially plane, the plane of an end being non-perpendicular to the axis of the spring when the spring is under working load, which comprises the steps of mounting the spring for compression with both its ends simultaneously free for universal tilting movement from their normal parallel position while so mounted, loading the spring to the working load, while so loaded determining the location on the non-perpendicular end the removal of material from which will cause the plane of the end to become perpendicular to the axis of the spring by remarking the portion of said end which is displaced during loading away from the central coils of the spring, and determining the amount of material to be removed by taking a measurement indicative of the displacement, during compression, of said portion from the position which it occupies when said end of the spring is correctly perpendicular to the axis of the spring.

3. A method of testing and correcting a compression spring substantially of the form of a cylindrical helix having its ends forming substantially plane surfaces, comprising the steps of mounting the spring for compression with both its ends simultaneously free for universal tilting movement from their normal parallel position; compressing the spring to its working load; determining the location on the spring of excess material in the end turns of the spring causing deviation of the planes of the ends from perpendicularity to the axis of the spring by locating the high points on the ends of the spring; determining the amount of the excess material corresponding thereto by rotating said spring about its axis of compression through 180°, locating the corresponding low points on the ends of said spring and measuring the distance between corresponding high and low points; removing the determined amount of excess material so that the planes of the ends will remain perpendicular to the axis of the spring under working load; compressing the spring to its full lift distance and observing any deviation of the planes on the ends from perpendicularity to the axis of the spring.

4. A device for compression testing of springs comprising a pair of spaced, opposed live centers, a pair of bearing plates, one each of which is mounted on a corresponding live center for universal angular movement relative thereto, said bearing plates comprising means for engaging opposite ends of a spring under test, and means mounting said live centers for rotation about the axis of compression of said spring.

5. A device for compression testing of springs comprising means for supporting a spring at either end thereof, means mounting said supporting means for universal angular movement relative to said mounting means, and means carrying said mounting means for rotation about the axis of compression of said spring whereby said spring while under compression can rotate freely about its axis of compression and both of its ends can be simultaneously displaced from perpendicularity to the axis of compression.

6. A device for compression testing of springs comprising a base member, a thrust bearing mounted in said base member, a live center mounted in said thrust bearing for rotation relative to said base member and about the axis of compression of a spring while said spring is under compression, a bearing plate for contact with one end of the spring and mounted on said live center for universal angular movement relative thereto; a compression head, a second thrust bearing mounted in said compression head, a second live center mounted in said second thrust bearing for rotation relative to said compression head and about the axis of compression of said spring while said spring is under compression, a second bearing plate for contact with the opposite end of the spring and mounted to bear against the second live center for universal angular movement relative thereto, whereby said spring while under compression can rotate freely about its axis of compression and both of its ends can simultaneously be displaced from perpendicularity to the axis of compression.

7. A device for compression testing of springs comprising a base member, a live center mounted on said base member and rotatable relative thereto and about the axis of compression of a spring when said spring is under compression, a bearing plate for contact with one end of the spring and mounted on said live center for universal angular movement relative thereto; a compression head, a second live center mounted on said compression head for rotation relative thereto and about the axis of compression of said spring while said spring is under compression, a second bearing plate for contact with the opposite end of the spring and mounted to bear against the second live center for universal angular movement relative thereto, whereby said spring while under compression can rotate freely about its axis of compression and both of its ends can be simultaneously displaced from perpendicularity to the axis of compression.

JOHN A. NODSON.

REFERENCES CITED

The following references are of record in the file of this patent:

UNITED STATES PATENTS

| Number | Name | Date |
| --- | --- | --- |
| Re. 21,242 | Bitzer et al. | Oct. 24, 1939 |
| 1,650,736 | Zelov | Nov. 29, 1927 |
| 2,346,281 | Templin | Apr. 11, 1944 |